US008602889B2

(12) United States Patent
Maekawa et al.

(10) Patent No.: US 8,602,889 B2
(45) Date of Patent: Dec. 10, 2013

(54) GAME PROGRAM FOR MOVING OBJECT FROM ONE DISPLAY TO ANOTHER DISPLAY

(75) Inventors: Yoshihiko Maekawa, Shibuya-ku (JP); Hiroyuki Kubota, Shibuya-ku (JP)

(73) Assignee: Nintendo Co., Ltd., Kyoto (JP)

( * ) Notice: Subject to any disclaimer, the term of this patent is extended or adjusted under 35 U.S.C. 154(b) by 986 days.

(21) Appl. No.: 11/542,240

(22) Filed: Oct. 4, 2006

(65) Prior Publication Data

US 2007/0078007 A1    Apr. 5, 2007

(30) Foreign Application Priority Data

Oct. 4, 2005  (JP) .................... 2005-291641

(51) Int. Cl.
*A63F 9/00*  (2006.01)
(52) U.S. Cl.
USPC ............................................. 463/32
(58) Field of Classification Search
None
See application file for complete search history.

(56) References Cited

U.S. PATENT DOCUMENTS

| 4,542,903 | A  | * | 9/1985 | Yokoi et al. ...................... 463/31 |
| 2002/0022509 | A1 | * | 2/2002 | Nicastro et al. .................. 463/15 |
| 2002/0151360 | A1 | * | 10/2002 | Durham et al. .................. 463/30 |
| 2003/0216177 | A1 | * | 11/2003 | Aonuma et al. ................. 463/32 |
| 2004/0209681 | A1 | * | 10/2004 | Emori et al. ...................... 463/31 |
| 2004/0214637 | A1 | * | 10/2004 | Nonaka ............................. 463/31 |
| 2005/0159197 | A1 | * | 7/2005 | Tawara ............................. 463/4 |
| 2005/0159217 | A1 | * | 7/2005 | Tawara ............................. 463/31 |
| 2005/0159223 | A1 | * | 7/2005 | Tahara et al. ................... 463/43 |
| 2005/0164794 | A1 | * | 7/2005 | Tahara ............................. 463/43 |
| 2005/0170887 | A1 | * | 8/2005 | Fujii ............................... 463/31 |
| 2005/0187023 | A1 |   | 8/2005 | Miyamoto et al. |
| 2006/0009286 | A1 | * | 1/2006 | Durham et al. .................. 463/30 |
| 2006/0073862 | A1 | * | 4/2006 | Shinoda et al. .................. 463/1 |
| 2008/0113793 | A1 |   | 5/2008 | Miyamoto et al. |

FOREIGN PATENT DOCUMENTS

| JP | 2005-192689 | 7/2005 |
| JP | 2005-230460 | 9/2005 |
| WO | WO2005/089895 | 9/2005 |

* cited by examiner

*Primary Examiner* — Seng H Lim
(74) *Attorney, Agent, or Firm* — Nixon & Vanderhye, P.C.

(57) ABSTRACT

When a method of operating a player character 40 is displayed on a first LCD 11, a movement of an enemy character 41 displayed on a second LCD 12 temporarily stops and the player character 40 moves from a display screen of the second LCD 12 to a display screen of the first LCD 11. Thus, a player's sight line is guided from the display screen of the second LCD 12 to the display screen of the first LCD 11 along with the movement of the player character 40, thereby allowing the player to confirm; with no oversight, that explanatory information regarding the method of operating the player character 40 is displayed.

14 Claims, 14 Drawing Sheets

GAME PROGRAM FOR MOVING OBJECT FROM ONE DISPLAY TO ANOTHER DISPLAY

CROSS REFERENCE TO RELATED APPLICATION

The disclosure of Japanese Patent Application No. 2005-291641, filed on Oct. 4, 2005, is incorporated herein by reference.

TECHNICAL FIELD

The exemplary embodiments disclosed herein relate to a game program for causing a computer in a game device to execute a game process.

BACKGROUND AND SUMMARY

As a technique for displaying a game explanatory information while a video game is being played, there is a technique described in Japanese Laid-Open Patent Publication No. 2005-192689 (hereinafter, referred to as patent document 1). In patent document 1, it is described that a game image is displayed on an upper screen and an image of the game explanatory information is displayed on a lower screen in accordance with a progress of the game. Thereby a player can play the game while looking at the image of the game explanatory information as needed.

In the technique of patent document 1, however, since the image of the game explanatory information is displayed on the screen which is different from the screen for displaying the game image, even when important game explanatory information regarding a game progress state is displayed at predetermined timing, the player who is absorbed in the game may not notice at all that the image of the game explanatory information is displayed.

Therefore, a feature of certain exemplary embodiments is to provide a display method which is capable of reminding a player in a natural manner that for example, important explanatory information or the like is displayed on a screen area which is different from a screen area at which the player is looking while playing a game.

Certain exemplary embodiments have the following aspects to attain the feature mentioned above. The reference numerals, supplementary explanations, and the like provided in parentheses merely illustrate correspondence with the below-described exemplary embodiments for assisting in understanding the exemplary embodiments, and by no means are intended to be limiting in any way.

A computer-readable storage medium according to certain exemplary embodiments is a computer-readable storage medium having game programs stored thereon which cause a computer (21), in a game device (10) comprising at least two image display areas (11, 12), to function as a first image display controller, a second image display controller, and a sight line guiding object display controller.

The first image display controller (50) is to display a first image on a first image display area (11).

The second image display controller (51) is to display a second image on a second image display area (12).

The sight line guiding object display controller (52) is to display a sight line guiding object (40, 42, 44), which guides a player's sight line from the second image display area to the first image display area, on the first image display area and the second image display area so as to gradually move from a second spot in the second image, across a boundary between the first image display area and the second image display area, to a first spot in the first image.

A first exemplary embodiment of the computer-readable storage medium of certain exemplary embodiments has a feature that the first image display area and the second image display respectively correspond to two display screens (11, 12) disposed in proximity to each other. Thus, by utilizing the sight line guiding object, a player's sight line can be guided in a natural manner from one to another of the two display screens disposed in proximity to each other.

A second exemplary embodiment of the computer-readable storage medium of certain exemplary embodiments has a feature that the first image is an image for displaying any of explanatory information regarding a map of a game space, explanatory information regarding a game operation method, and explanatory information regarding a progress state of the game.

A third exemplary embodiment of the computer-readable storage medium of certain exemplary embodiments has a feature that the second image display controller temporarily stops movements of other objects displayed on the second image display area at least while the sight line guiding object is moving from the second image display area to the first image display area. Thus, since the progress of the game stops while the sight line guiding object is moving from the second image display area to the first image display area, a player can move his or her sight line at ease to the first image display area.

A fourth exemplary embodiment of the computer-readable storage medium of certain exemplary embodiments has a feature that the second image is an image showing a game world in which a player character (40) operated by a player is included and the first image is an image for explaining a method of operating the player character. Thus, a method of operating the player character can be informed in an ensured manner to a player who is absorbed in a game.

A fifth exemplary embodiment of the computer-readable storage medium of certain exemplary embodiments has a feature that the sight line guiding object is the player character (FIG. 4). Thus, by utilizing, as the sight line guiding object, the player character which is an object to which the player is paying most attention, the player's sight line can be guided to the first image display area in an effective manner.

A sixth exemplary embodiment of the computer-readable storage medium of certain exemplary embodiments has a feature that the sight line guiding object is a character (42) which is different from the player character (FIG. 6). Thus, unnatural feeling which may be caused when the sight line guiding object moves from the second image display area to the first image display area can be reduced, as compared to a case where the player character is utilized as the sight line guiding object.

A seventh exemplary embodiment of the computer-readable storage medium of certain exemplary embodiments has a feature that when the first image display controller displays the explanatory information on the first image display area, the sight line guiding object display controller displays the sight line guiding object on the first image display area and the second image display area so that the sight line guiding object moves from the second spot to the first spot.

An eighth exemplary embodiment of the computer-readable storage medium of certain exemplary embodiments has a feature that the second image is an image showing the game world and the first image is an image showing the map of the game world, thus allowing a player to see the map of the game world in an ensured manner while playing a game.

A ninth exemplary embodiment of the computer-readable storage medium of certain exemplary embodiments has a feature that the first spot is a spot on the map of the game world, which corresponds to a spot displayed on the first image display area (FIG. 8). Thus, the spot on the map, which corresponds to the spot displayed on the second image display area, can be informed to the player in an easy-to-see manner.

A tenth exemplary embodiment of the computer-readable storage medium of certain exemplary embodiments has a feature that when a course to a destination is informed to the player by utilizing the map in the first image, the sight line guiding object display controller displays the sight line guiding object on the first image display area and the second image display area so that the sight line guiding object moves from the second spot to the first spot. Thus, when the course to the destination is informed to a player by utilizing the map in the first image, the player's sight line can be guided to the first image display area in an ensured manner.

An eleventh exemplary embodiment of the computer-readable storage medium of certain exemplary embodiments has a feature that the first spot is a spot on the map of the game world, which corresponds to a spot at which an event occurring at the spot displayed on the first image display area exerts an influence (FIG. 11). Thus, the spot on the map, which corresponds to the spot at which an event occurring in the game world exerts an influence, can be informed to a player in an easy-to-see manner.

A twelfth exemplary embodiment of the computer-readable storage medium of certain exemplary embodiments has a feature that when the spot at which the event occurring at the spot displayed on the first image display area exerts the influence is informed to a player, the sight line guiding object display controller displays the sight line guiding object (44) on the first image display area and the second image display area so that the sight line guiding object moves from the second spot to the first spot. Thus, when the spot at which an event exerts an influence is informed to a player, the player's sight line can be guided to the first image display area in an ensured manner.

A game device of certain exemplary embodiments comprises: a first image display controller (21, 50) for displaying a first image on a first image display area (11); a second image display controller for displaying a second image on a second image display area; and a sight line guiding object display controller (21, 52) for displaying a sight line guiding object (40, 42, 44), which guides a player's sight line from the second image display area to the first image display area, on the first image display area and the second image display area so as to gradually move from a second spot in the second image, across a boundary between the first image display area and the second image display area, to a first spot in the first image.

According to certain exemplary embodiments, even if a player is absorbed in a game, by visually following the sight line guiding object, the player's sight line is inevitably moved to a screen area on which explanatory information or the like is displayed, thus preventing a situation where a player overlooks information or the like which is required for a progress of a game.

These and other features, aspects and advantages of certain exemplary embodiments will become more apparent from the following detailed description when taken in conjunction with the accompanying drawings.

DETAILED DESCRIPTION

A configuration and operations of a game device according to a first exemplary embodiment will be described below.

Figure 1:
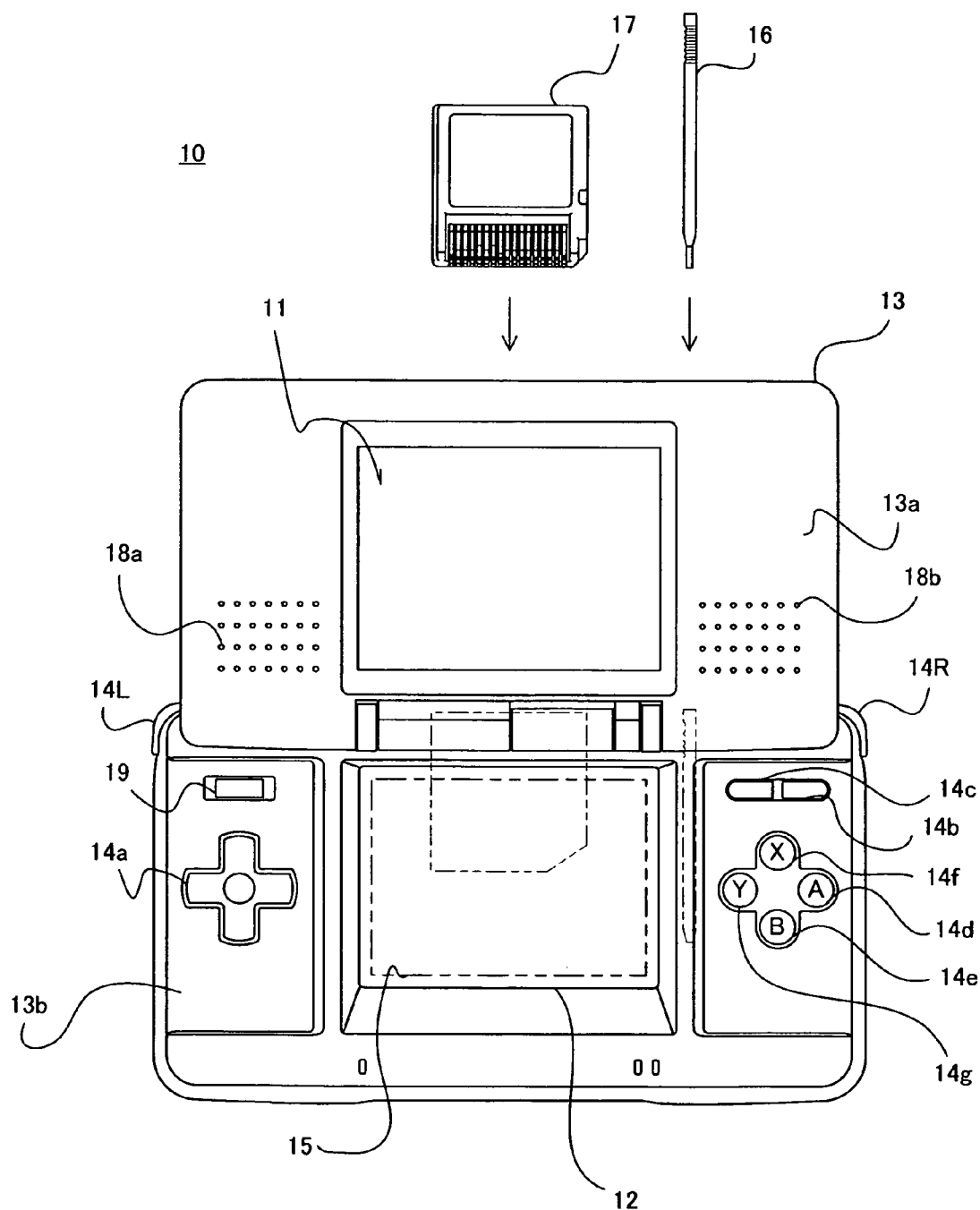
FIG. 1 is a diagram illustrating an external view of a game device according to a first exemplary embodiment.

FIG. 1 is a diagram illustrating an external view of a game device according to a first embodiment. In FIG. 1, a game device 10 includes a first LCD (Liquid Crystal Display) 11 and a second LCD 12. A housing 13 comprises an upper housing 13a and a lower housing 13b, and the first LCD 11 is accommodated in the upper housing 13a, and the second LCD 12 is accommodated in the lower housing 13b. Resolutions of the first LCD 11 and the second LCD 12 are both 256 dots×192 dots. Note that though an LCD is used as a display device in the present embodiment, any other display devices such as a display device using an EL (Electro Luminescence) may be used. Also, the resolution of the display device may be at any level.

The upper housing 13a is provided with sound holes 18a and 18b for outputting a sound from a pair of loudspeakers (30a and 30b shown in FIG. 2) to an exterior. A description of the pair of loudspeakers will be provided later.

The lower housing 13b is provided with input devices as follows; a cross switch 14a, a start switch 14b, a select switch 14c, a "A" button 14d, a "B" button 14e, a "X" button 14f, a "Y" button 14g, a "L" button 14L, and a "R" button 14R. In addition, a touch panel 15 is provided on a screen of the second LCD 12 as another input device. The lower housing 13b further includes a power switch 19, and insertion openings for storing a memory card 17 and a stick 16.

The touch panel 15 may be of any type such as a resistive film type, an optical type (infrared type), or a capacitive coupling type. The touch panel 15 has a function of outputting, when its surface is touched with the stick 16, coordinate data which corresponds to a touch position. Though the following description is provided on an assumption that the player uses a stick 16 to operate the touch panel 15, of course the touch panel 15 may also be operated by a pen (stylus pen) or a finger instead of the stick 16. A touch panel 15 used in the present embodiment has a same resolution at 256 dots×192 dots (detection accuracy) as that of the second LCD 12. However, resolutions of the touch panel 15 and the second LCD 12 may not necessarily be consistent with each other.

The memory card 17 is a storage medium having a game program stored therein, and placed in the insertion slot provided at the lower housing 13b in a removable manner.

Next, an internal configuration of the game device 10 will be described with reference to FIG. 2.

Figure 2:
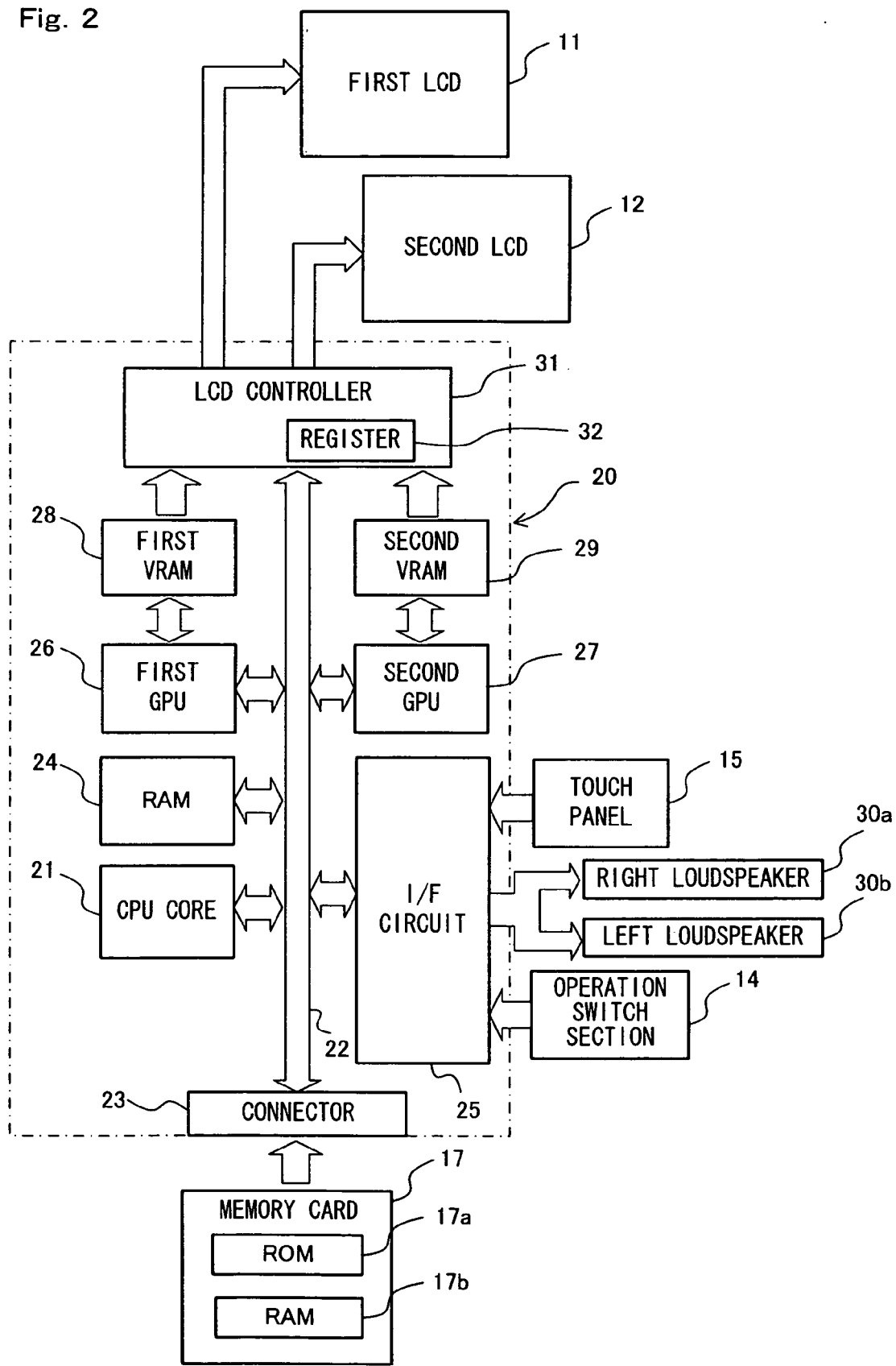
FIG. 2 is a diagram illustrating an internal configuration of the game device.

In FIG. 2, a CPU core 21 is mounted on an electronic circuit board 20 which is to be housed in the housing 13. Via a bus 22, the CPU core 21 is connected to a connector 23, an input/output interface circuit (shown as I/F circuit in the diagram) 25, a first GPU (Graphics Processing Unit) 26, a second GPU 27, a RAM 24, and an LCD controller 31. The memory card 17 is connected to the connector 23 in a removable manner. The memory card 17 includes a ROM 17a for storing a game program and a RAM 17b for storing backup data in a rewritable manner. The game program stored in the ROM 17a of the memory card 17 is loaded to the RAM 24, and the game program having been loaded to the RAM 24 is executed by the CPU core 21. The RAM 24 stores, in addition to the game program, data such as temporary data which is obtained by the CPU core 21 executing the game program, and data for generating a game image. To the I/F circuit 25 are connected, a touch panel 15, a right loudspeaker 30a, a left loudspeaker 30b and an operation switch section 14, which is comprised of a cross switch 14a, a "A" button 14d, and others, as shown in FIG. 1. The right loudspeaker 30a and the left loudspeaker 30b are arranged inside the sound holes 18a and 18b, respectively.

A first VRAM (Video RAM) 28 is connected to the first GPU 26, and a second VRAM 29 is connected to the second GPU 27. In accordance with an instruction from the CPU core 21, the first GPU 26 generates a first game image based on data used for image generation which is stored in the RAM 24, and writes images into the first VRAM 28. The second GPU 27 also follows an instruction from the CPU core 21 to generate a second game image, and writes images into the second VRAM 29. The first VRAM 28 and the second VRAM 29 are connected to the LCD controller 31.

The LCD controller 31 includes a register 32. The register 32 stores a value of either 0 or 1 in accordance with an instruction from the CPU core 21. When the value of the register 32 is 0, the LCD controller 31 outputs to the first LCD 11 the first game image which has been written into the first VRAM 28, and outputs to the second LCD 12 the second game image which has been written into the second VRAM 29. When the value of the register 32 is 1, the first game image which has been written into the first VRAM 28 is outputted to the LCD 12, and the second game image which has been written into the second VRAM 29 is outputted to the first LCD 11.

Further, the setting of the game device 10 as mentioned above is merely an example. The exemplary embodiments described herein are applicable to any computer system which comprises at least one display device. Also, the game program described herein can be supplied to a computer system not only by the way of an external storage medium such as a memory card 17, but also by the way of a wired or wireless communication path. The program can also be recorded beforehand in a nonvolatile storage inside of a computer system.

Hereinafter, a flow of a game process executed by the game device 10 will be described with reference to examples of a game screen image.

Figure 3:
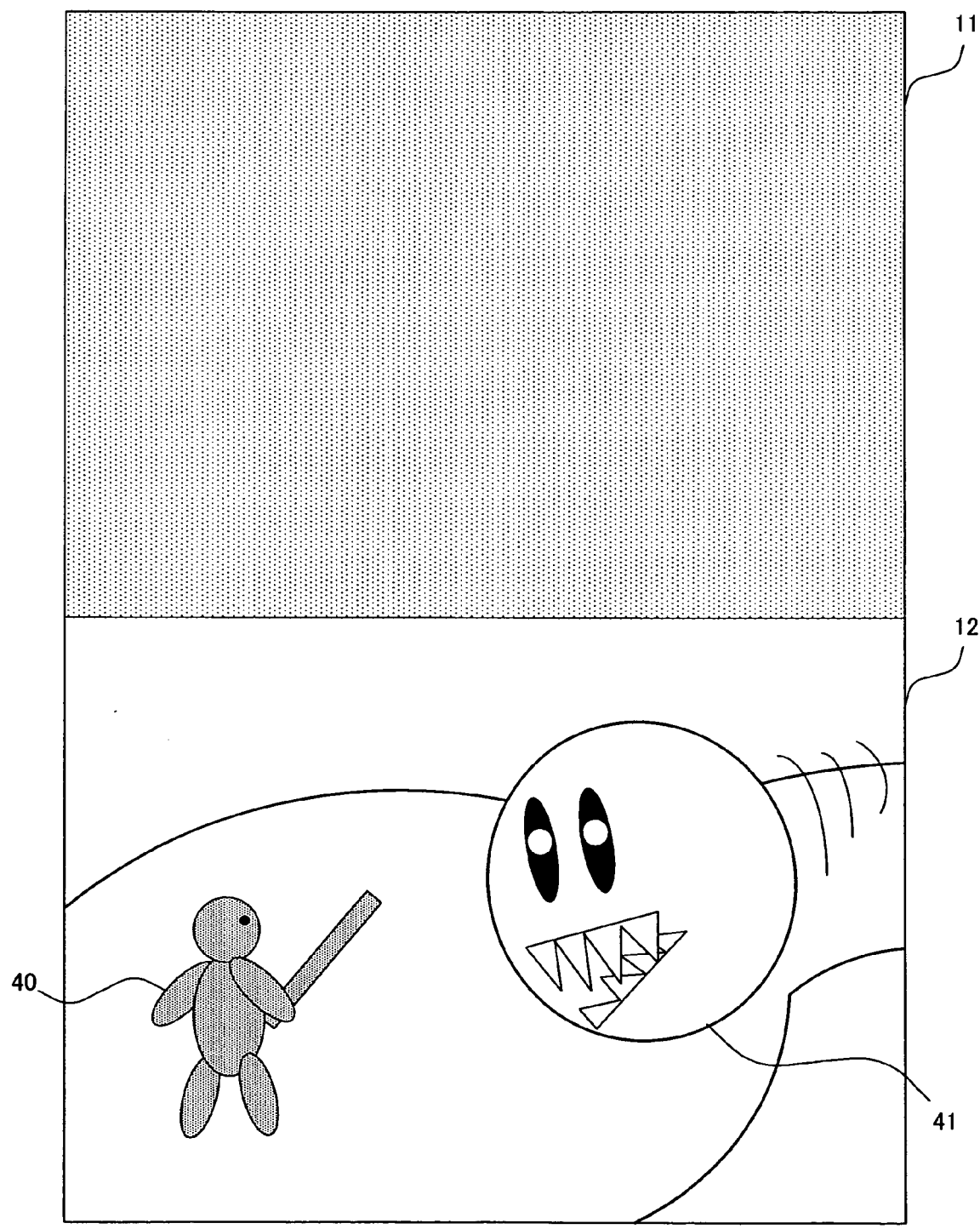
FIG. 3 is a diagram showing an example of a game image.

FIG. 3 is a diagram showing an example of an image displayed on a first LCD 11 and a second LCD 12, in which in a game world, a player character 40 operated by a player encounters an enemy character 41 and is just about to fight against the enemy character 41. Although displayed on the first LCD 11 is an image which informs the player of a method of operating the player character 40 or the like, explanatory information is not yet displayed here. On the second LCD 12, a view in which the enemy character 41 is approaching the player character 40 is displayed.

Figure 4:
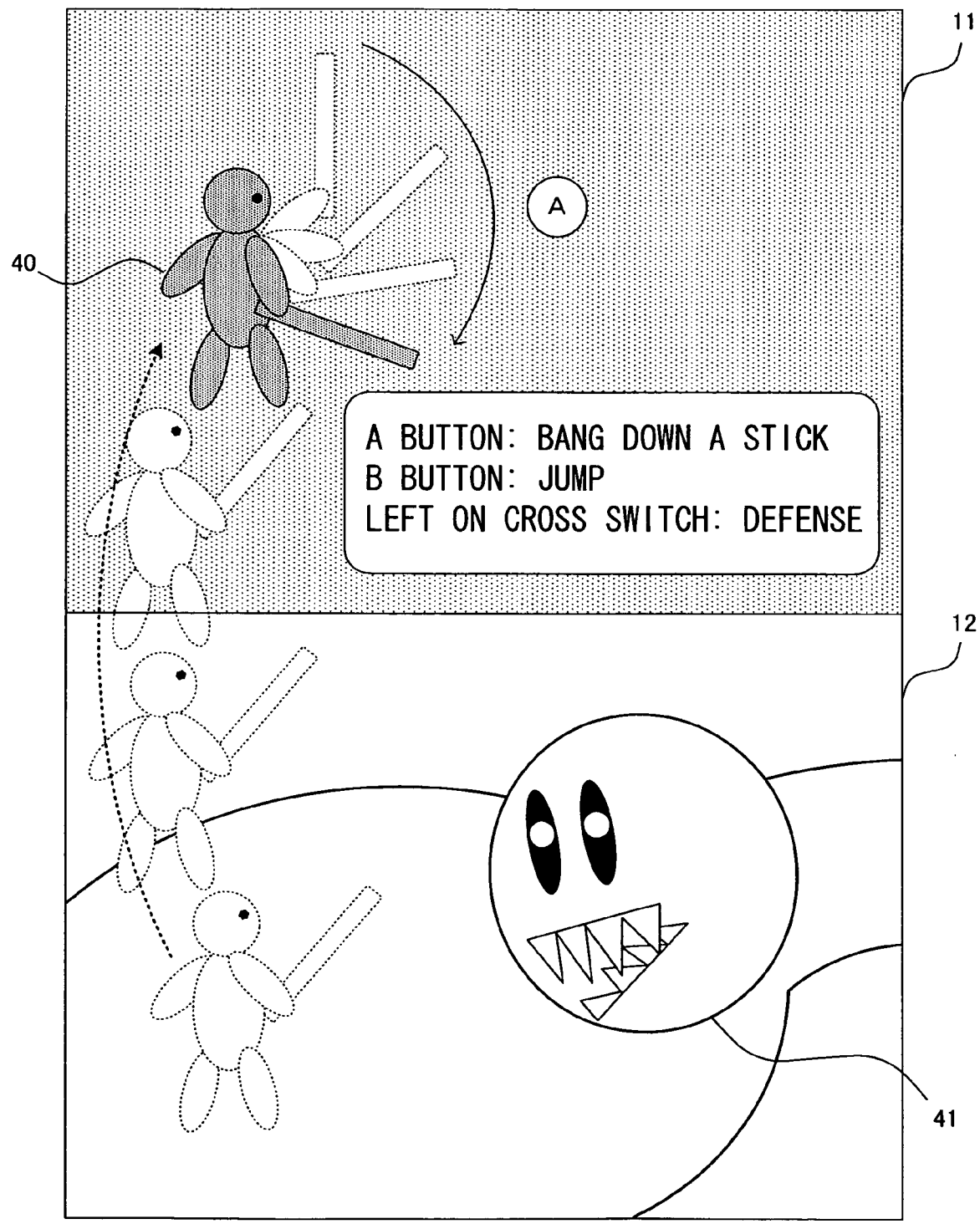
FIG. 4 is a diagram showing another example of a game image.

Immediately after a situation shown in FIG. 3 comes, a method of operating the player character 40 who is going to fight against the enemy character 41 is displayed on the first LCD 11. FIG. 4 is a diagram showing an example of an image displayed on the first LCD 11 and the second LCD 12, in which the method of operating the player character 40 is displayed on the first LCD 11. Here, a movement of the enemy character 41 displayed on the second LCD 12 temporarily stops (in other words, a stream of time in the game world displayed on the second LCD 12 temporarily stops) and the player character 40 gradually moves from a display screen of the second LCD 12 to a display screen of the first LCD 11 as shown by an arrow with a dotted line in FIG. 4. Thus the player's sight line is guided from the display screen of the second LCD 12 to the display screen of the first LCD 11 along with the movement of the player character 40, thereby allowing the player to confirm, with no oversight, that explanatory information regarding the method of operating the player character 40 is displayed.

In the meantime, if the player character 40 is instantaneously moved from the display screen of the second LCD 12 to the display screen of the first LCD 11, the player may lose sight of the player character 40 and be puzzled. In the present embodiment, however, the player character 40 is displayed so as to move across a boundary between the first LCD 11 and the second LCD 12 as shown by the arrow with the dotted line in FIG. 4, thereby allowing the player's sight line to be guided from the display screen of the second LCD 12 to the display screen of the first LCD 11 in a natural manner without causing any puzzlement for the player. When the player character 40 moves across the boundary between the first LCD 11 and the second LCD 12, the player character 40 may be displayed so as to appear on the display screen of the first LCD 11 after having completely disappeared from the display screen of the second LCD 12 (in other words, in a case where there is no moment when the player character 40 is displayed concurrently on both of the display screen of the first LCD 11 and the display screen of the second LCD 12). The player character 40 may be displayed so that a part of the player character 40 appears from the display screen of the first LCD 11 before having completely disappeared from the display screen of the second LCD 12 (in other words, in a case where there is a moment when the player character 40 is displayed concurrently on both of the display screen of the first LCD 11 and the display screen of the second LCD 12).

In addition, since the stream of time in the game world displayed on the second LCD 12 temporarily has stopped, the player can concentrate on looking at the explanatory information regarding the operation method at ease without caring about a situation in the game world.

Figure 5:
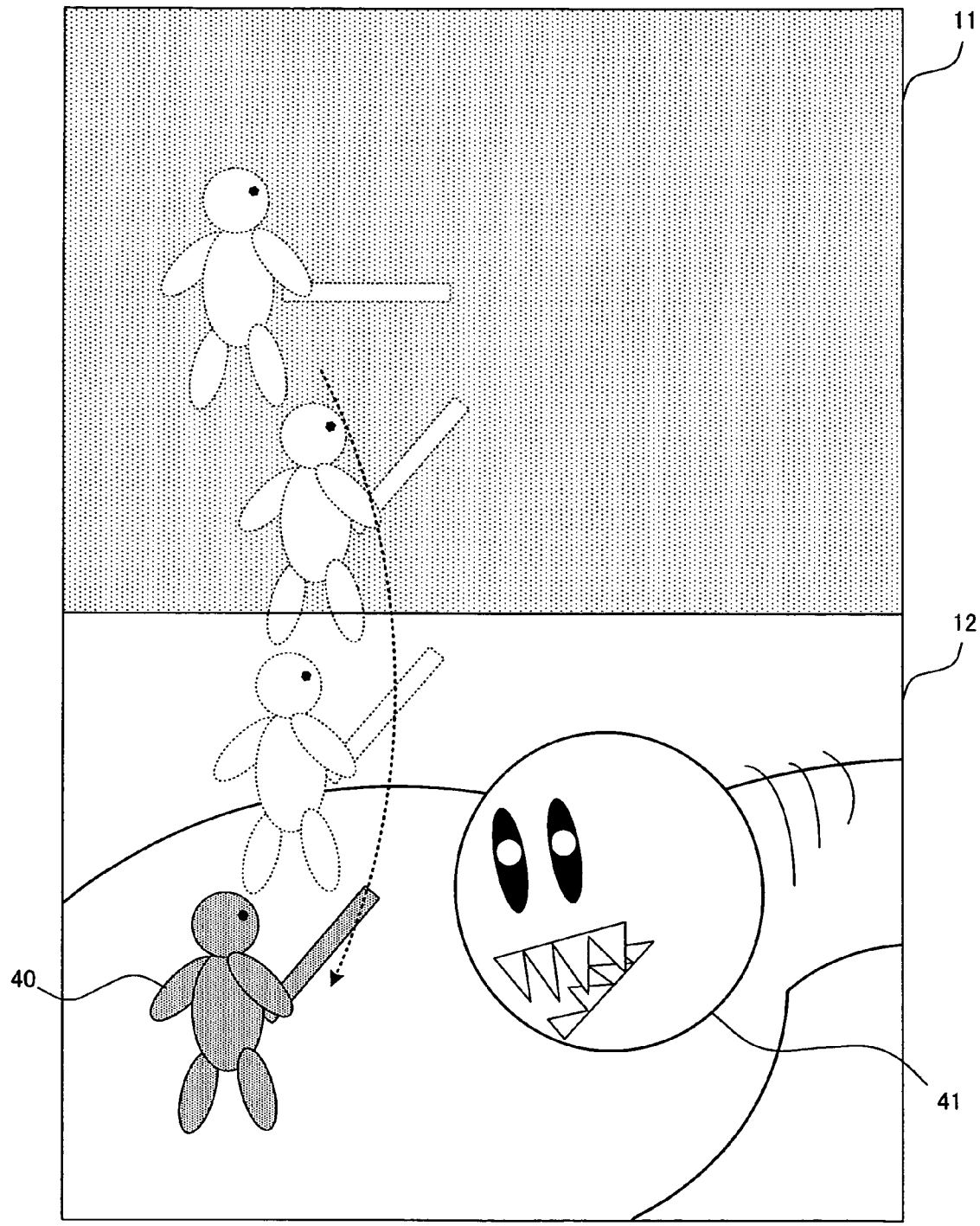
FIG. 5 is a diagram showing another example of a game image.

As shown in FIG. 5, after displaying the explanatory information regarding the operation method is finished, the player character 40 returns to an original display position and the enemy character 41 resumes moving.

Figure 6:
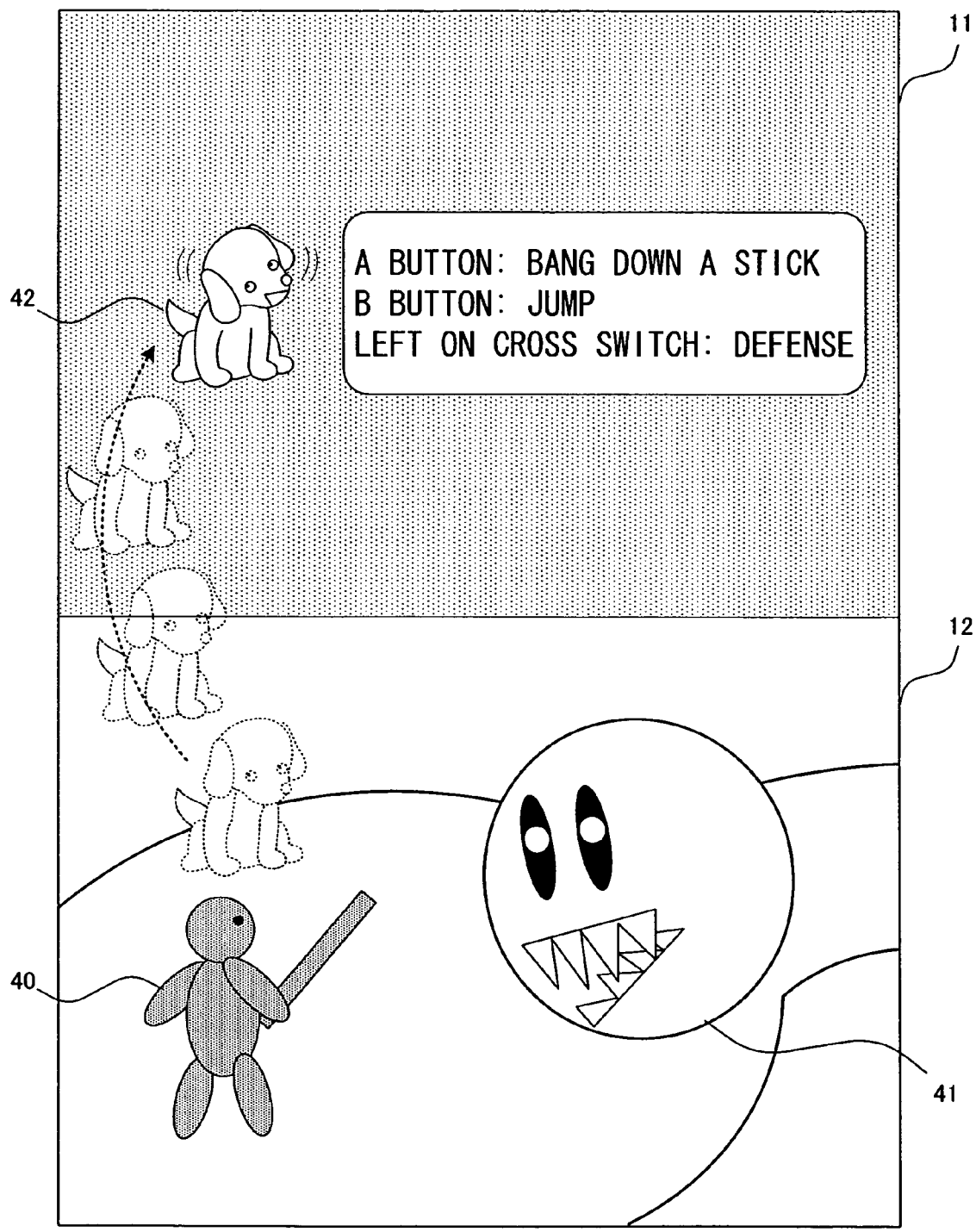
FIG. 6 is a diagram showing another example of a game image.

Although in the example described above, the player's sight line is guided from the second LCD 12 to the first LCD 11 by utilizing the player character 40, a method of guiding the player's sight line is not limited to this and the player's sight line may be guided from the second LCD 12 to the first LCD 11 by utilizing any object. FIG. 6 is a diagram showing an example in which the player's sight line is guided from the second LCD 12 to the first LCD 11 by utilizing a non-player character 42 which is automatically controlled by a computer. Also in this case, it is desirable that the stream of time in the game world displayed on the second LCD 12 temporarily stops while the explanatory information is being displayed on the first LCD 11.

In the meantime, it is not only in a case of displaying the explanatory information regarding the operation method that such a method of guiding the player's sight line is effective. Hereinafter, with reference to FIGS. 7 to 9, another example of a method of guiding the player's sight line will be described.

Figure 7:
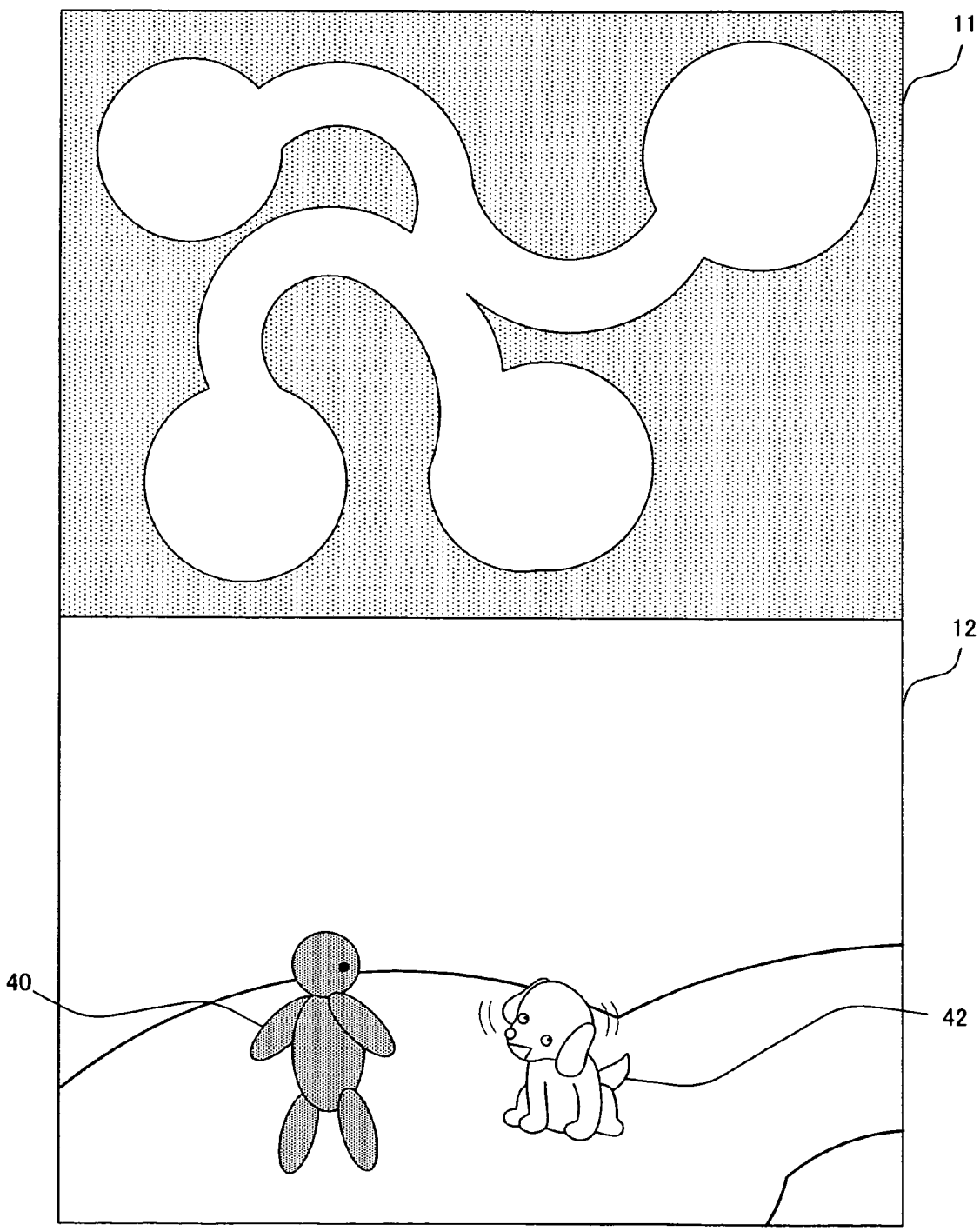
FIG. 7 is a diagram showing another example of a game image.

FIG. 7 is a diagram showing an example of an image displayed on the first LCD 11 and the second LCD 12, in which in a game world, the player character 40 encounters the non-player character 42. On the first LCD 11, a map of the game world is displayed. Hereinafter, a display example in a case where this non-player character 42 guides the player character 40 to a predetermined destination will be described.

Figure 8:
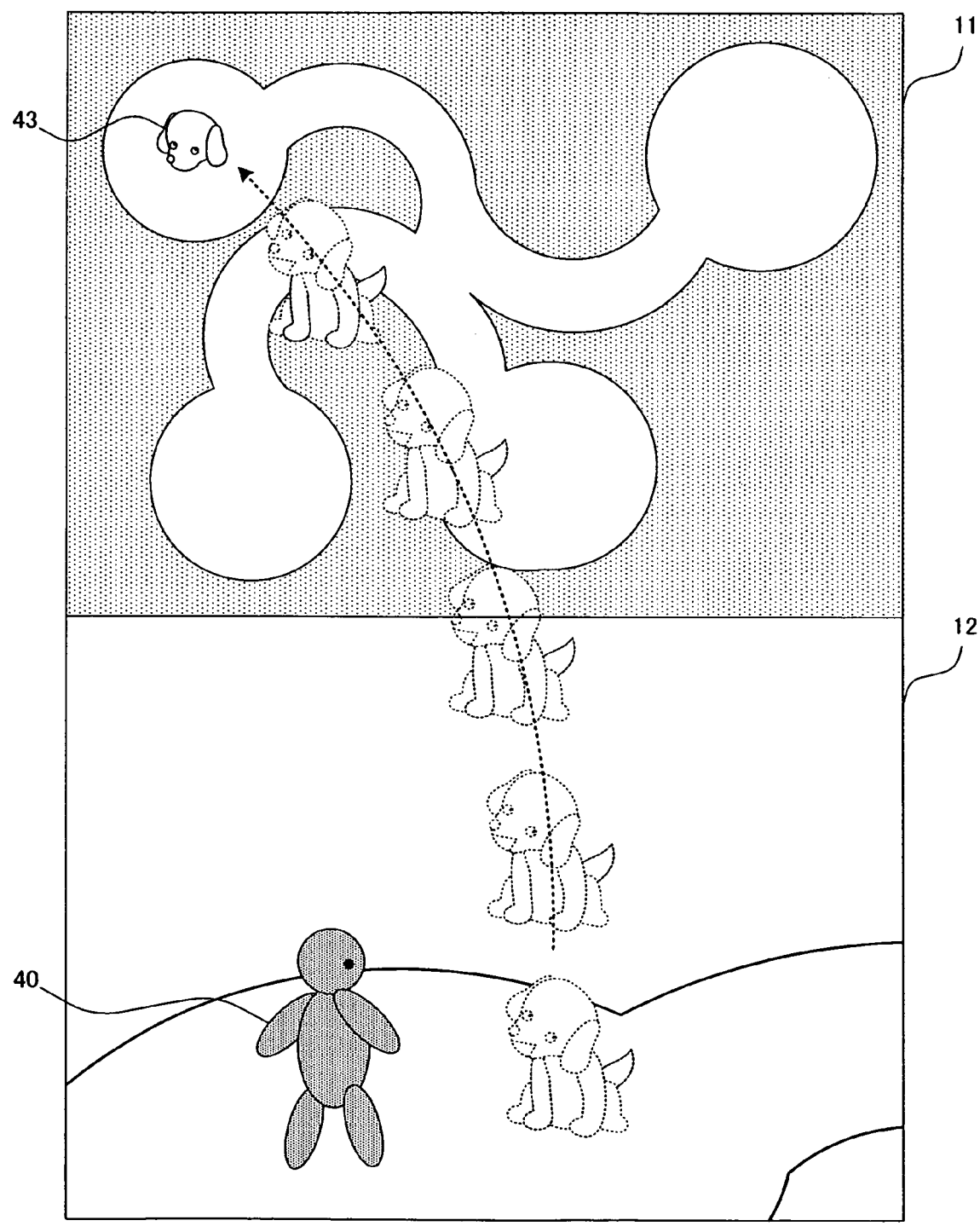
FIG. 8 is a diagram showing another example of a game image.

First, as shown by an arrow with a dotted line in FIG. 8, the non-player character 42 moves from the display screen of the second LCD 12 to the display screen of the first LCD 11. More specifically, the non-player character 42 moves from a display position shown in FIG. 7, across the boundary between the first LCD 11 and the second LCD 12, to a spot on the map, which corresponds to a current position (in other words, a spot in a game space, which is displayed on the second LCD 12). After the non-player character 42 finishes moving to the spot on the map, which corresponds to the current position, a mark 43 indicating the current position of the non-player character 42 is displayed at the spot.

Figure 9:
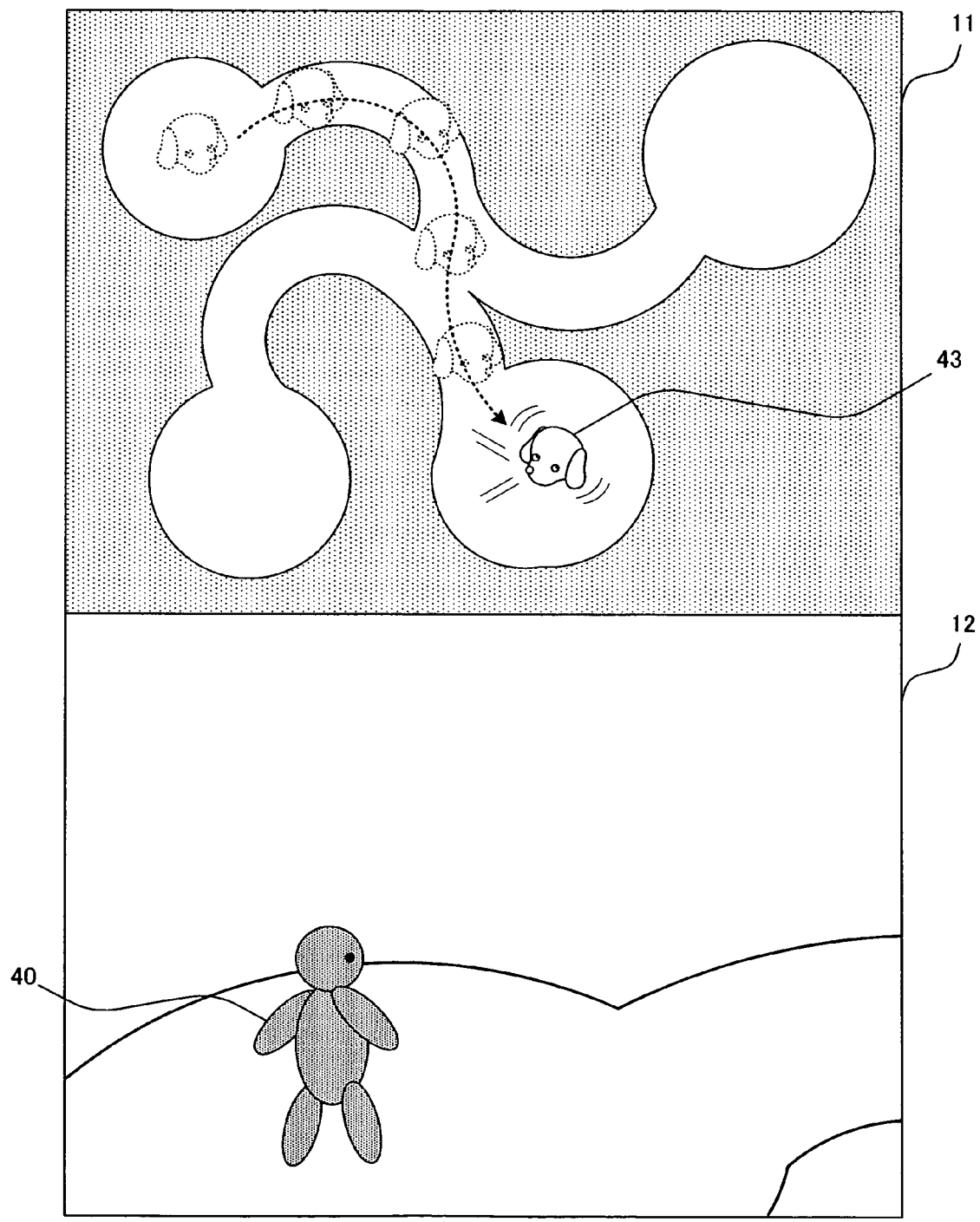
FIG. 9 is a diagram showing another example of a game image.

Subsequently, as shown in FIG. 9, the mark 43 of the non-player character 42 moves on the map to the destination (in other words, a spot at which the player desires to guide the player character 40) along a predetermined course. When the player confirms this, the player operates and moves the player character 40 to the destination.

Also in this example, it never happens that without any previous notice, information of a course is displayed on the map displayed on the first LCD 11, and as shown in FIG. 8, the player's sight line is guided from the display screen of the second LCD 12 to the display screen of the first LCD 11 by utilizing the mark 43 of the non-player character 42 and thereafter the information of the course is displayed, whereby the player can avoid overlooking the displayed information of the course.

In addition, after the non-player character 42 has been moved to the spot on the map corresponding to the current position as shown in FIG. 8, the non-player character 42 is moved to the destination as shown in FIG. 9, thereby allowing the player to grasp all of the "current position", the "destination", and the "course from the current position to the destination" in an intuitive manner.

Next, with reference to FIGS. 10 and 11, another example of a method of guiding the player's sight line will be described.

Figure 10:
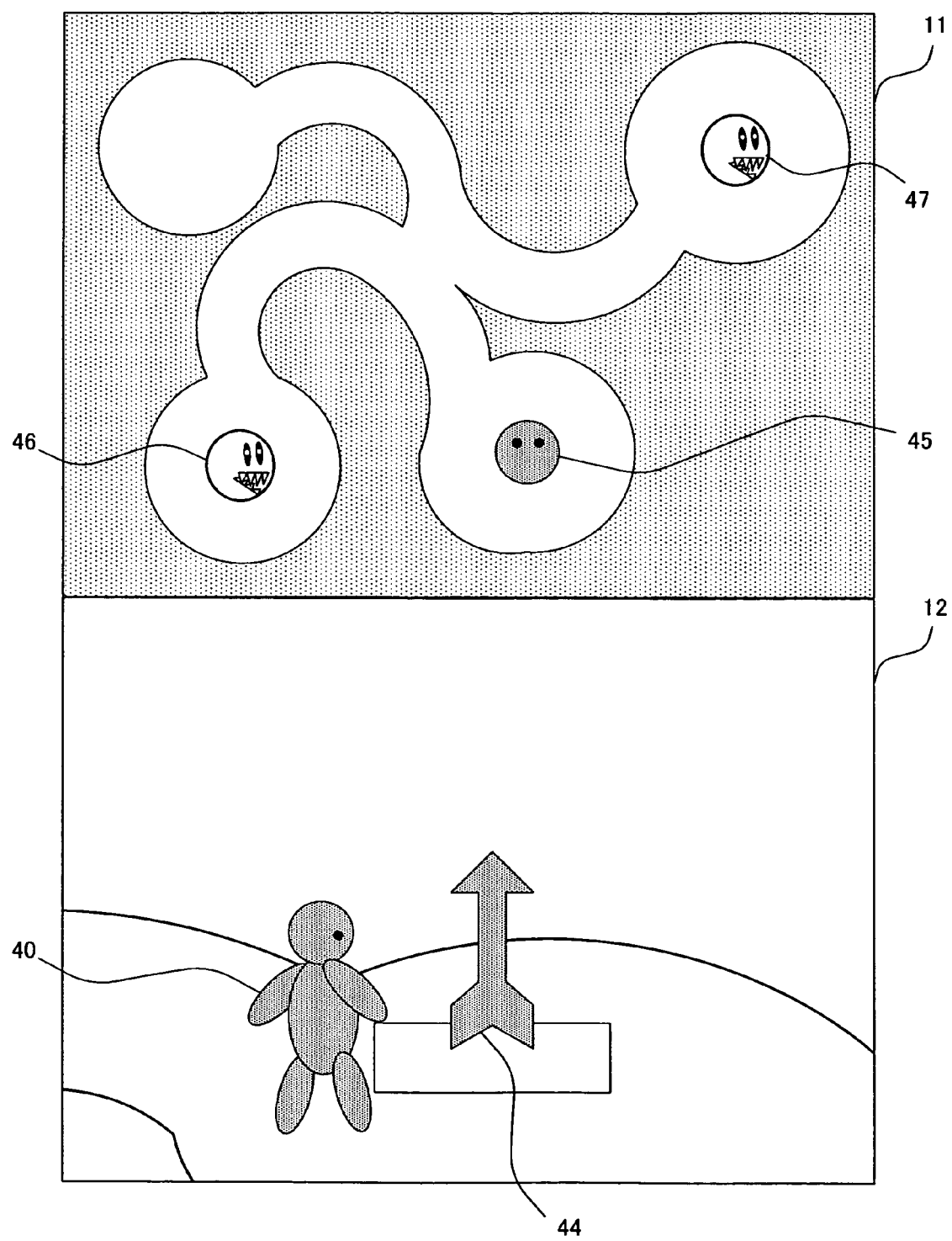
FIG. 10 is a diagram showing another example of a game image.

FIG. 10 is a diagram showing an example of an image displayed on the first LCD 11 and the second LCD 12, in which in a game world, the player character 40 is going to fire a missile. On the first LCD 11, a map of the game world is displayed, and a mark 45 which indicates a current position of the player character 40 and marks 46 and 47 which indicate respective current positions of two enemy characters are displayed on the map.

Figure 11:
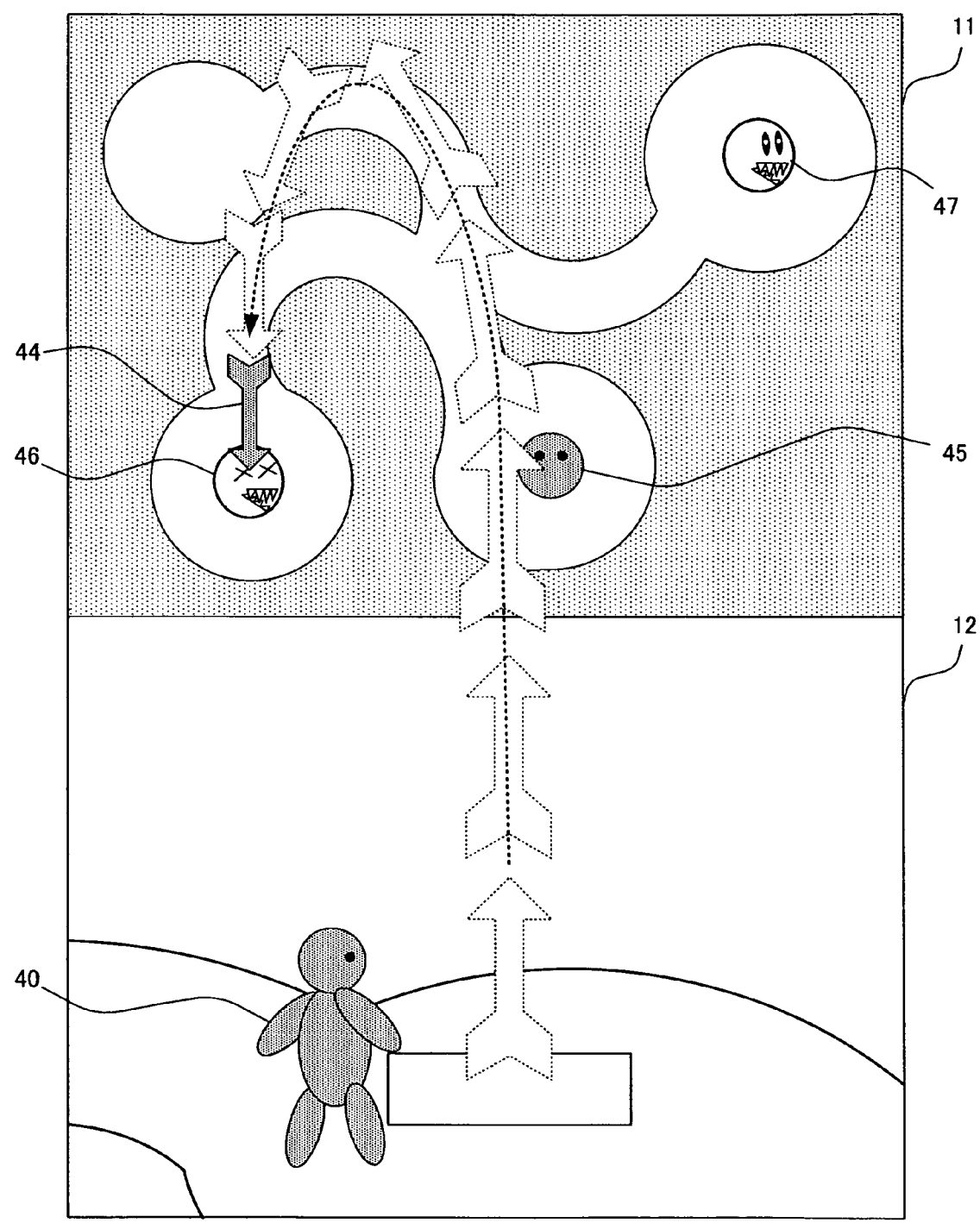
FIG. 11 is a diagram showing another example of a game image.

When the player character 40 fires a missile 44 in accordance with a player's input operation, as shown in FIG. 11, the missile 44 moves from the display screen of the second LCD 12, across the boundary between the first LCD 11 and the second LCD 12, to a spot on the map (in the example shown in FIG. 11, a spot at which the mark 46 indicating the current position of the enemy character is displayed), which corresponds to a land-in spot of the missile 44 in the game world. Through displaying in such a manner, the player's sight line is guided from the display screen of the second LCD 12 to the display screen of the first LCD 11 along with a moving position of the missile 44 displayed, thereby allowing the player to grasp in an ensured manner that the missile 44 hits the enemy character corresponding to the mark 46.

Next, operations of the game device 10 will be described in detail. Here, although in order to facilitate understanding, the operations of the game device 10 in a case where the example described with reference to FIGS. 3 to 5 is carried out will be described, the other examples described above can be carried out in a manner described below.

Figure 12:
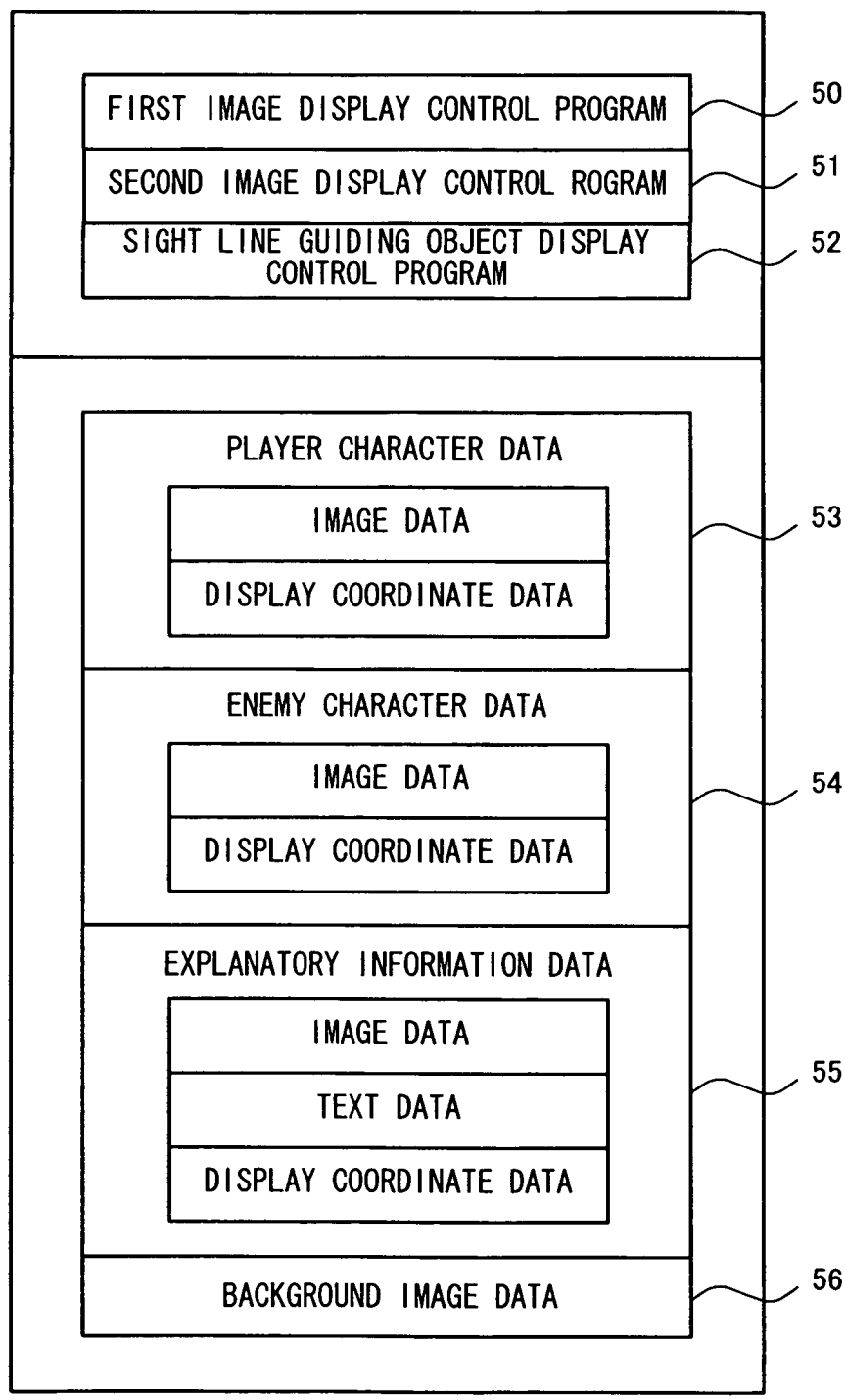
FIG. 12 is a diagram showing a memory map of a RAM 24.

FIG. 12 is a memory map of a RAM 24. In the RAM 24, a first image display control program 50, a second image display control program 51, a sight line guiding object display control program 52, player character data 53, enemy character data 54, explanatory information data 55, and background image data 56 are stored.

The first image display control program 50 is to generate an image (image for explaining an operation method) displayed on the first LCD 11. The second image display control program 51 is to generate an image (image of the game world, in which the player character 40 and the enemy character 41 are included) displayed on the second LCD 12. As shown in FIGS. 4 and 5, the sight line guiding object display control program 52 is to cause the player character 40 to move back and forth between the display screen of the first LCD 11 and the display screen of the second LCD 12. At the start of a game, these programs (hereinafter, generically referred to simply as game programs) are loaded from the ROM 17a in the memory card 17 to the RAM 24 and executed by the CPU core 21.

The player character data 53 is data regarding the player character 40 in the game world, which contains image data and display coordinate data. The enemy character data 54 is data regarding the enemy character 41 in the game world, which contains image data and display coordinate data. The explanatory information data 55 is data regarding explanatory information displayed on the first LCD 11, which contains image data, text data, and display coordinate data. The background image data 56 is image data for displaying a landscape of the game world displayed on the second LCD 12. At the start of the game, these pieces of image data and text data are loaded from the ROM 17a in the memory card 17 to the RAM 24 and are used by the CPU core 21 during the execution of the game programs. And the display coordinate data is appropriately updated during the execution of the game programs.

Figure 13:
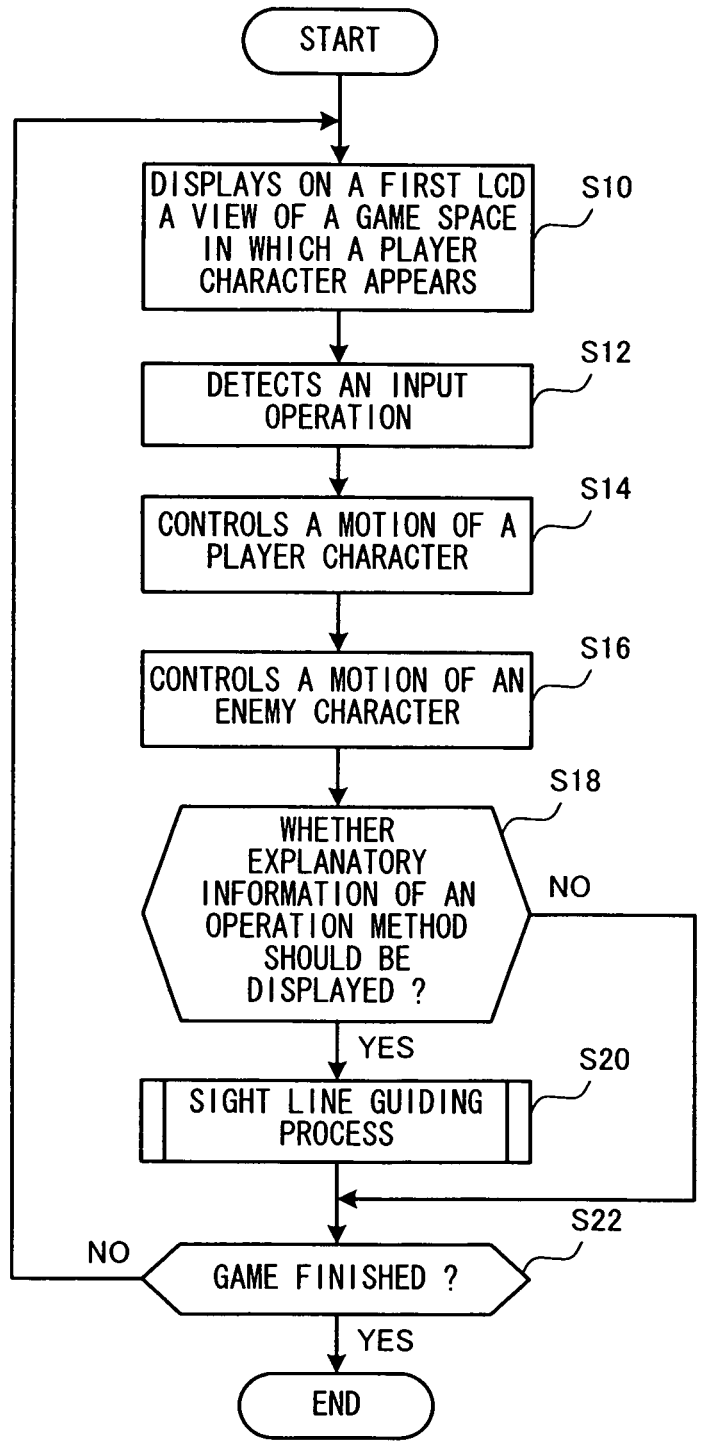
FIG. 13 is a flowchart showing operations of the game device.

Next, with reference to a flowchart shown in FIG. 13, a flow of a process performed by the CPU core 21 based on the game programs will be described.

First at step S10, the CPU core 21 generates an image showing a view of a game space in which the player character 40 appears and displays this image on the first LCD 11.

At step S12, the CPU core 21 detects an input operation by the player based on a signal from the operation switch section 14 or the touch panel 15.

At step 14, the CPU core 21 controls a movement (including a change of a position) of the player character 40 in accordance with the input operation detected at step S12 and updates the display coordinate data on the player character 40, which has been stored in the RAM 24.

At step S16, the CPU core 21 controls a movement of the enemy character 41 in accordance with a predetermined algorithm and updates the display coordinate data on the enemy character 41, which has been stored in the RAM 24.

At step 18, the CPU core 21 determines whether explanatory information on a method of operating the player character 40 should be displayed, and when the explanatory information on the operation method of the player character 40 should be displayed, proceeds to step S20 and when the explanatory information on the operation method of the player character 40 should not be displayed, proceeds to step S22.

At step S20, the CPU core 21 executes a sight line guiding process. Details of this sight line guiding process will be described hereinunder.

At step S22, the CPU core 21 determined whether the game has been finished, and when the game has been finished, ends the execution of the game programs and when the game has not been finished, returns to step S10.

Figure 14:
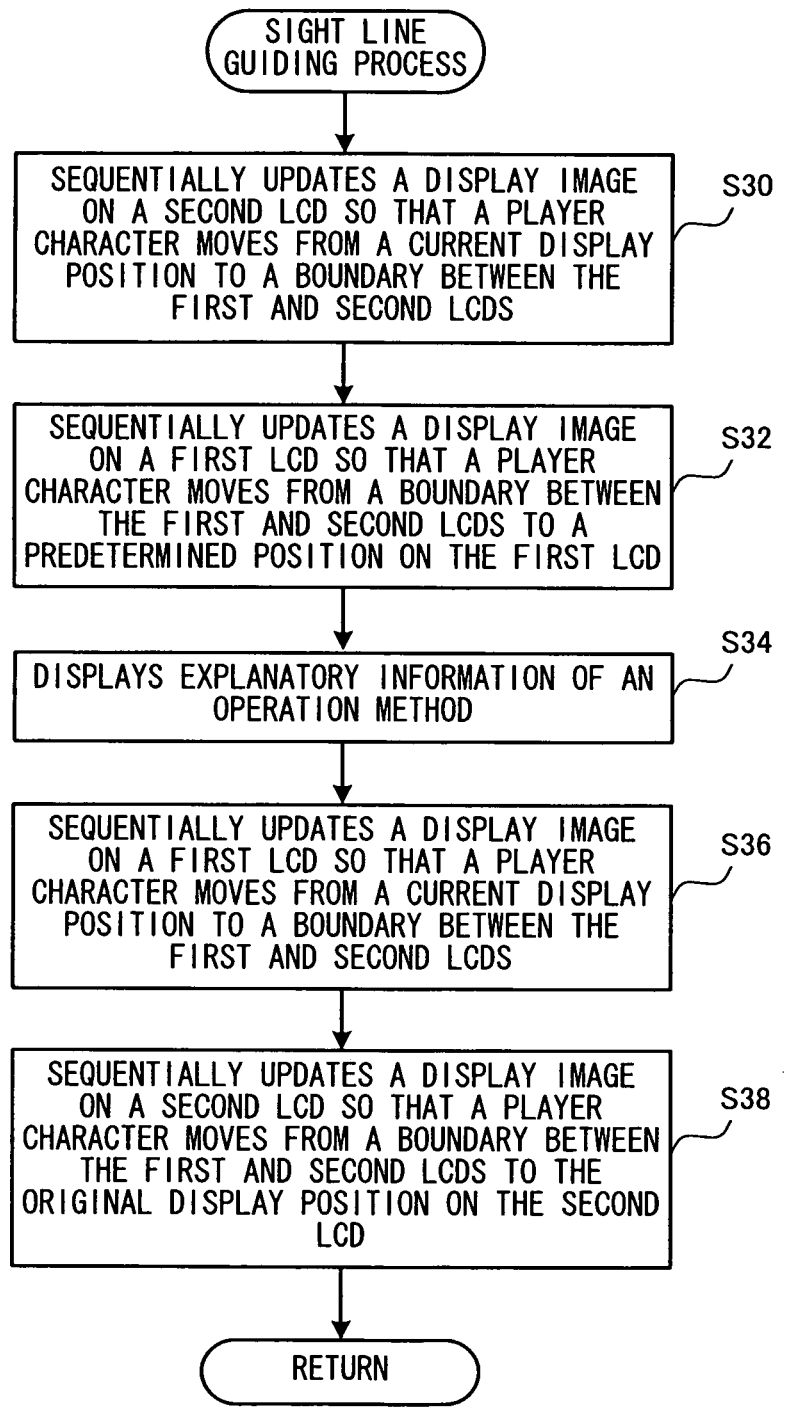
FIG. 14 is a flowchart showing a flow of a sight line guiding process.

Next, with reference to a flowchart shown in FIG. 14, the details of the sight line guiding process performed at step S20 in FIG. 13 will be described. Because the process at step S16 in FIG. 13 is not executed while the sight line guiding process is being executed, the movement of the enemy character 41 displayed on the second LCD 12 temporarily stops.

First at step S30, the CPU core 21 sequentially updates the display image on the second LCD 12 so that the player character 40 moves from a current display position to the boundary between the display screen of the first LCD 11 and the display screen of the second LCD 12.

At step S32, the CPU core 21 sequentially updates the display image on the first LCD 11 so that the player character 40 moves from the boundary between the display screen of the first LCD 11 and the display screen of the second LCD 12 to a predetermined position on the first LCD 11.

At step S34, the CPU core 21 displays the explanatory information on the method of operating the player character 40 on the first LCD 11. This process at step S34 may be executed before the process at step S 32 or the process at step S30.

At step S36, the CPU core 21 sequentially updates the display image on the first LCD 11 so that the player character 40 moves from a current display position to the boundary between the display screen of the first LCD 11 and the display screen of the second LCD 12.

At step S38, the CPU core 21 sequentially updates the display image on the second LCD 12 so that the player character 40 moves from the boundary between the display screen of the first LCD 11 and the display screen of the second LCD 12 to the original display position (in other words, the display position of the player character 40 immediately before the process at step S30 is executed) on the second LCD. Then the sight line guiding process is finished.

As stated above, according to the present embodiment, in a case where information to be provided to the player is displayed on the display screen of the first LCD 11 while the player is playing the game looking at the display screen of the second LCD 12, since an object (the player character, the non-player character, or other object) is displayed so as to move from the display screen of the second LCD 12 toward the display screen of the first LCD 11, even when the player is absorbed in the game, the player's sight line can be guided in an ensured manner from the display screen of the second LCD 12 to the display screen of the first LCD 11.

Although in the present exemplary embodiment, the game device comprising the two independent display screens is described, the exemplary embodiments are not limited to this and it can be effective to divide an area of one display screen into two areas which are utilized as two display screens in a virtual manner.

While certain exemplary embodiments have been described in detail, the foregoing detailed description is in all aspects illustrative and not restrictive. It is understood that numerous other modifications and variations can be devised without departing from the scope of the exemplary embodiments described herein.

What is claimed is:

1. A non-transitory computer-readable storage medium having game programs stored thereon which cause a computer, in a game device comprising at least two image display areas, to perform functionality comprising:

displaying a first image on a first image display area;

displaying a second image on a second image display area; and displaying a sight line guiding object, which guides a player's sight line from the second image display area to the first image display area, on the first image display area and the second image display area so as to gradually move from a second spot in the second image, across a boundary between the first image display area and the second image display area, to a first spot in the first image, wherein the first image relates to map information about a game operating on the second image display area and the map information represents a wider range of a game world than a range of a game world represented by the second image and the first spot is a spot on the map.

2. The non-transitory computer-readable storage medium according to claim 1, wherein the first image display area and the second image display area respectively correspond to two display screens disposed in proximity to each other.

3. The non-transitory computer-readable storage medium according to claim 1, wherein the first image further includes explanatory information regarding a progress state of the game.

4. The non-transitory computer-readable storage medium according to claim 3, wherein movement of other objects displayed on the second image display area are temporarily stopped at least while the sight line guiding object is moving from the second image display area to the first image display area.

5. The non-transitory computer-readable storage medium according to claim 1, wherein the second image is an image showing a game world in which a player character operated by a player is included and the first image is an image for explaining a method of operating the player character.

6. The non-transitory computer-readable storage medium according to claim 5, wherein the sight line guiding object is the player character.

7. The non-transitory computer-readable storage medium according to claim 5, wherein the sight line guiding object is a character which is different from the player character.

8. The non-transitory computer-readable storage medium according to claim 1, wherein when the first image display controller displays the map information on the first image display area, the sight line guiding object display controller displays the sight line guiding object on the first image display area and the second image display area so that the sight line guiding object moves from the second spot to the first spot.

9. The non-transitory computer-readable storage medium according to claim 1, wherein when a course to a destination is informed to a player by utilizing the map in the first image, the sight line guiding object is displayed on the first image display area and the second image display area so that the sight line guiding object moves from the second spot to the first spot.

10. The non-transitory computer-readable storage medium according to claim 1, wherein the first spot is a spot on the map of the game world, which corresponds to a spot at which an event occurring at the spot displayed on the first image display area exerts an influence.

11. The non-transitory computer-readable storage medium according to claim 10, wherein when the spot at which the event occurring at the spot displayed on the first image display area exerts the influence is informed to a player, the sight line guiding object is displayed on the first image display area and the second image display area so that the sight line guiding object moves from the second spot to the first spot.

12. A game device comprising: a processor;
- a memory coupled to said processor, said memory storing instructions that, when
- executed by said processor, control said processor to perform functionality comprising:
- display a first image on a first image display area;
- display a second image on a second image display area; and
- display a sight line guiding object, which guides a player's sight line from the second image display area to the first image display area, on the first image display area and the second image display area so as to gradually move from a second spot in the second image, across a boundary between the first image display area and the second image display area, to a first spot in the first image, wherein the first image relates to map information about a game operating on the second image display area and the map information represents a wider range of a game world than a range of a game world represented by the second image and the first spot is a spot on the map.

13. A system, comprising:
- a game apparatus comprising at least two image display areas and an image processor configured to perform functionality comprising:
- displaying a first image on a first image display area;
- displaying a second image on a second image display area; and
- displaying a sight line guiding object, which guides a player's sight line from the second image display area to the first image display area, on the first image display area and the second image display area so as to gradually move from a second spot in the second image, across a boundary between the first image display area and the second image display area, to a first spot in the first image, wherein the first image relates to map information about a game operating on the second image display area and the map information represents a wider range of a game world than a range of a game world represented by the second image and the first spot is a spot on the map.

14. The non-transitory computer-readable storage medium according to claim 1, further comprising displaying the second image area so as to gradually and automatically transition an appearance of the sight line guiding object from the second spot in the second image, across the boundary between the first image display area and the second image display area, to the first spot in the first image.

* * * * *